United States Patent [19]
Aldrich

[11] Patent Number: 6,154,217
[45] Date of Patent: *Nov. 28, 2000

[54] GAMUT RESTRICTION OF COLOR IMAGE

[75] Inventor: Ronald Keith Aldrich, Kirkland, Wash.

[73] Assignee: Software Architects, Inc., Bothell, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/842,593

[22] Filed: Apr. 15, 1997

[51] Int. Cl.$^7$ .................................................. G06T 11/40
[52] U.S. Cl. .............................................................. 345/431
[58] Field of Search ..................................... 345/431, 153, 345/154, 155

[56] References Cited

U.S. PATENT DOCUMENTS

| | | | |
|---|---|---|---|
| 5,185,661 | 2/1993 | Ng | 358/505 |
| 5,416,890 | 5/1995 | Beretta | 345/431 |
| 5,510,910 | 4/1996 | Bockman et al. | 358/502 |
| 5,590,251 | 12/1996 | Takagi | 345/431 |
| 5,611,030 | 3/1997 | Stokes | 345/431 |
| 5,724,442 | 3/1998 | Ogatsu et al. | 382/167 |
| 5,831,604 | 11/1998 | Gerber | 345/431 |
| 5,867,170 | 2/1999 | Peterson | 345/431 |

OTHER PUBLICATIONS

Web site publication http://www.mbp.duke.edu/usevs/qu2/color/node3.html Apr. 13, 1997 Quoc An Nguyen Color Clipping.

Primary Examiner—Mark Zimmerman
Assistant Examiner—Huedung X. Cao
Attorney, Agent, or Firm—Graybeal Jackson Haley LLP

[57] ABSTRACT

A user selects an optimum balance between two different methods for clipping or compressing the colors of an image so that they all fall within the color gamut of an output device. By choosing a balance between two different clipping or compression methods, which are typically implemented with different color models, the user can quickly and easily adjust the colors of an image to produce the most desired image. If a color monitor can display all or nearly all of the colors of the output device, the image can be displayed on a color monitor and the user can very quickly choose between alternative adjustments of the balance between the two clippings or compression methods.

67 Claims, 5 Drawing Sheets

GAMUT RESTRICTION OF COLOR IMAGE

FIELD OF THE INVENTION

The present invention relates to methods for restricting the colors specified in pixels of an image to fall within the limitations of an image printing or display device.

BACKGROUND OF THE INVENTION

The human eye can perceive a wider range or gamut of colors than can be presented by devices for generating images such as computer monitors, photographs, and printers. An image represented in digital form which contains colors falling beyond the gamut of the device for presenting the image must be restricted by clipping or by compression or by a combination of the two. For a thorough explanation of the problem, see U.S. Pat. No. 5,416,890 to Beretta, assigned to Xerox Corporation. Also, even if the image is to be presented in a device with as broad a gamut of colors as contained in the original image, such as when the original image is captured on film and is to be presented on film, it is often desirable to adjust the brightness or contrast or saturation or hue. Any of these adjustments can cause some of the colors to be generated to exceed the color gamut of the output device.

For digital storage and manipulation by a computer, images are typically stored in a three color cubic space, such as RGB (red, green, blue) as shown in FIG. 3. A simple compression method for restricting the colors of an image to the gamut of a device is to reduce each of the R, G, and B values by a ratio until all values fall within the gamut of the device. This is unsatisfactory because it does not take advantage of a large portion of the colors available and produces an image of poor color quality. A solution which takes advantage of all colors available is to simply clip any values of R, G, and B which exceed the permissible range. This will cause any pixel which is clipped to change its color.

Beretta explains how the color representation can be transformed from a three color representation to a "hue", "chroma" (or saturation), and "lightness" (or value or brightness) representation. There are many mathematical models which implement such a representation system, including CIELAB, HSV, HLS, and TekHVC. See Beretta and Foley, J., COMPUTER GRAPHICS SECOND EDITION, Addison Wesley, 1993, chapter 13.3. Using any one of these mathematical models, the hue can be held constant while the lightness or chroma are clipped or compressed to remap the colors of each pixel so that they fall within the gamut of the output device. In the prior art, it is also known to clip or compress both the lightness and the chroma to reach a color which is the shortest perceptual displacement from the original color (CIELAB$\Delta$E). See U.S. Pat. No. 5,611,030 to Stokes.

Unfortunately, there is no method of clipping or compressing based on a single model which produces the best result in each case. Depending upon the characteristics of the particular image, one or another model using one or another of the methods of clipping or linear compression or non-linear compression may produce the best result.

SUMMARY OF THE INVENTION

The invention is a method for allowing a user to subjectively select the most effective balance between two or more alternative methods for clipping or compressing the colors of an image into the gamut of an output device. The preferred embodiment is a software system which runs on a computer system with a color monitor whose color gamut is, in all dimensions, greater than or equal to the color gamut of the selected output device. The color gamut of the output device can then be entirely expressed on the computer display. At least two algorithms for limiting the colors of the image to the gamut of the output device are programmed. The image in question is then processed with both of the limiting algorithms. A weighted average of the two outputs is then computed with the weighting selected by the user. The resulting image is then displayed. The user adjusts the weighting to achieve the most desired image as selectively judged by the user.

Alternatively, if the color monitor cannot display all of the colors of the output device, many copies of the image, each with a different weighting, are transmitted to the output device for review by the user and selection of the preferred weighting.

The principal application for the invention is to allow users to adjust the colors of photographs taken with digital cameras prior to generating the final output in the form of a computer displayed image, a computer printed image, or computer generated film output. In addition to single or still images, the invention also applies to sequences of images such as video. In this case, the user will select a typical image for each scene and adjust the color limiting methods to produce the best results for that scene. The system then applies the same balance of limiting methods to all of the images from that scene. When applied to a television, the viewer can adjust the balance between two or more limiting algorithms at any time as the show continues.

In addition to choosing between two alternative algorithms for limiting the colors to fit the gamut of the output device, the user can be given three or more competing algorithms from which to choose weightings for an average. If the user is presented with three alternative methods for limiting the colors, the user interface can be a cursor placed within a triangle. Moving the cursor to a corner of the triangle uses one of the methods; placing the cursor on an edge of the triangle achieves a weighted blending between two methods; and placing the cursor anywhere within the interior of the triangle achieves a weighted blend of three methods.

In addition to a control for choosing weighting between alternative methods of limiting the color gamut, the user is typically also given controls for adjusting the contrast, brightness, saturation, and hue. Even if the gamut of the output device is equal to that of the input device, adjustments to any of these controls can cause the output colors to exceed the gamut of the output device. If the lightness (or brightness or value) is increased, some pixels of the image will likely exceed the gamut by being too light. Conversely, if the lightness is decreased, some pixels will be too dark. If the contrast is increased, the lightness (or brightness or value) of pixels may exceed the gamut in both being too light and in being too dark.

This invention allows the user to create more detailed images by allowing the user to use more contrast and brightness when editing digital images. It allows the user a choice of using more extreme settings while still retaining an attractive image. Greater accuracy can be retained in images which are undisplayable because the color hue can be retained at the expense of saturation (or chroma) and lightness (or brightness or value).

DETAILED DESCRIPTION

Figure 1A:
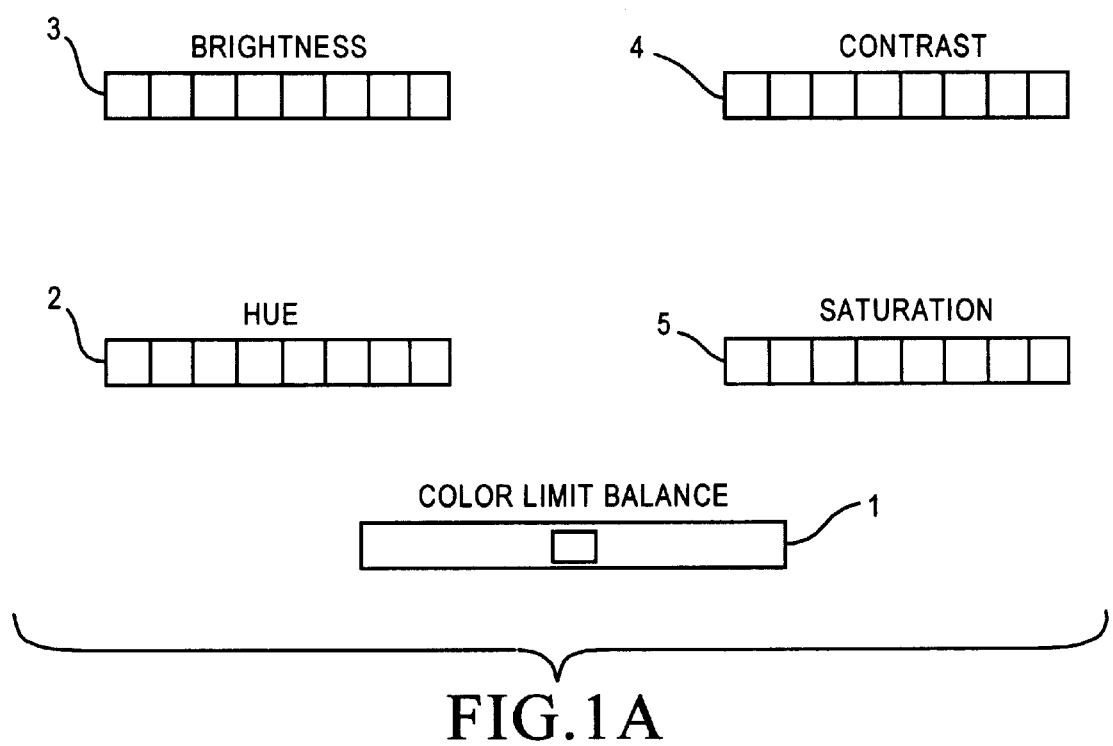
FIG. 1a shows the user interface with the color limit balance control for balancing between two algorithms.
Figure 1B:
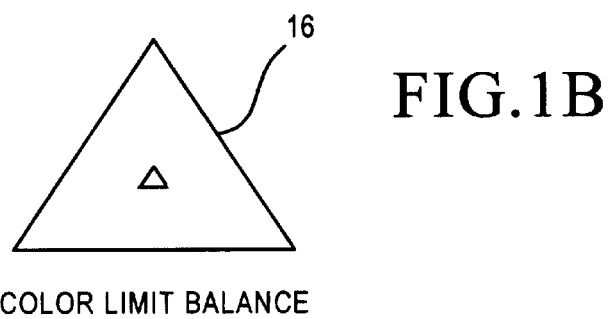
FIG. 1b show the color limit balance control for balancing between three algorithms.

FIG. 1a shows the user interface for controlling the software which implements the method. The color limit balance control 1 allows the user to choose the weighting between two algorithms for balancing limits on the colors to fall within the gamut of the output device. Where three algorithms are considered rather than two, the color limit balance control 16 is a triangle with a cursor marking the balance between the three algorithms as shown in FIG. 1b.

The hue, brightness, contrast, and saturation controls 2, 3, 4, and 5 are each presented to the user as a thumb wheel, the surface of which is dragged with the cursor to the right or the left. This type of control allows high precision without requiring a large screen display. In the preferred embodiment, each square on the presented edge of the thumb wheel is displayed with a texture or color which shows the effect it will produce. The hue control shows colors ranging from balanced flesh tones to extreme colors, like on a television. The brightness control shows varying shades of gray from white to black. The saturation control shows three fully saturated colored bars in each square on one end and the same three bars in each square progressively less saturated to gray at the other end. The contrast control shows two bars in each square, white and black at one end progressing to gray for both bars at the other end.

Figure 2:
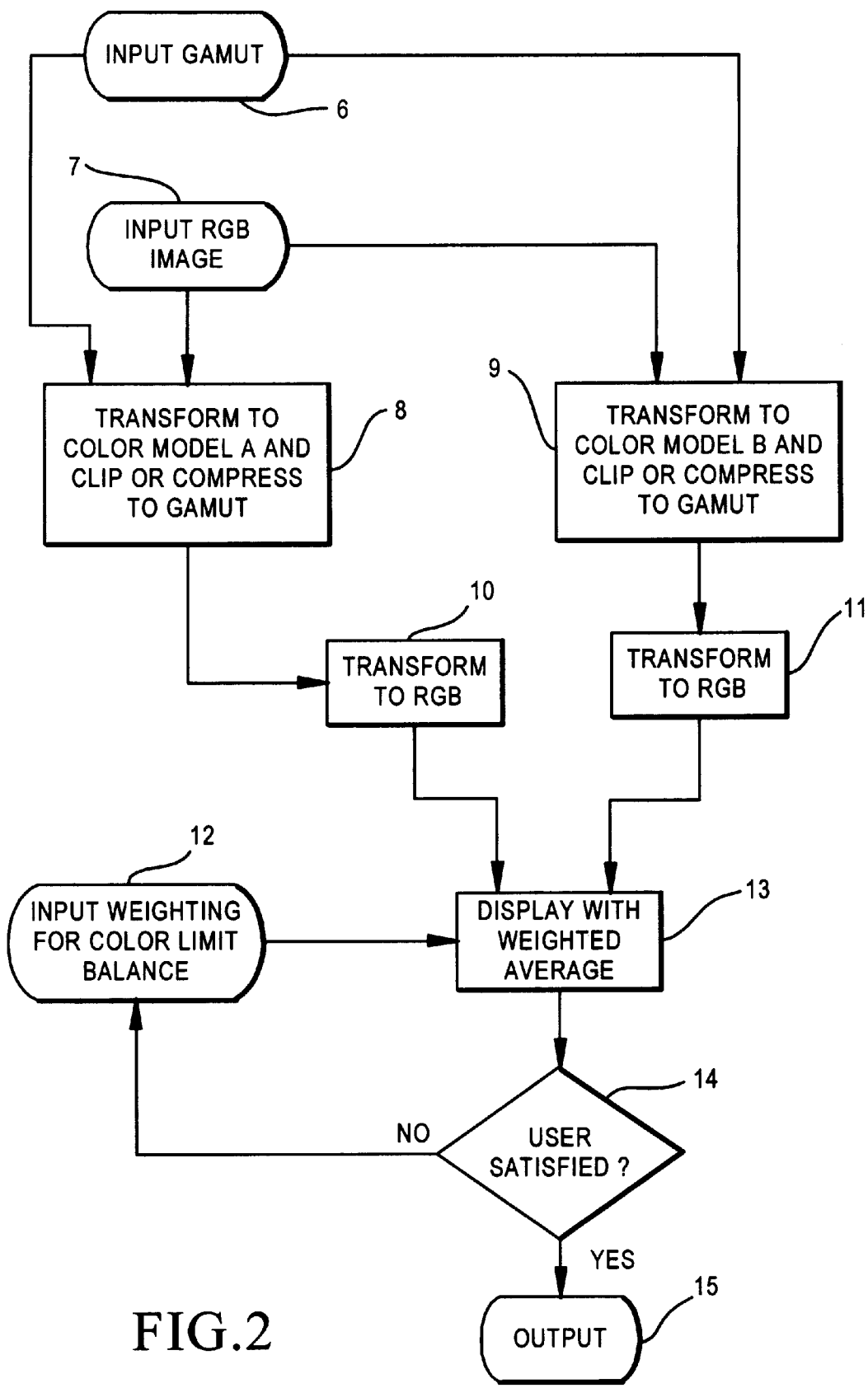
FIG. 2 shows a flow chart of the method.

FIG. 2 shows the method which is employed when the user is adjusting the color limit balance of an image. The color gamut of the output device is input to the system, step 6. In the preferred embodiment, the software comes with standard devices preloaded for their color gamuts and the user merely selects the output device. The user then inputs an image, step 7, such as by retrieving via a PCMCIA port an image file created with a digital camera. Alternatively, the image might be a typical image from a scene in a video program or a computer generated image. For the first algorithm, the image is automatically transformed into a first color model (Color Model A in FIG. 2) and clipped or compressed to the selected gamut, step 8. For the second algorithm, it is also transformed to a second color model (Color Model B in FIG. 2) and clipped or compressed to the gamut, step 9. Steps 8 and 9 can use the same color model but different clipping or compression algorithms. Although it may make the mathematics more complicated, steps 10 and 11 can be omitted and the clipping or compression can be performed on the original representation of the image, whatever it happens to be.

Figure 4:
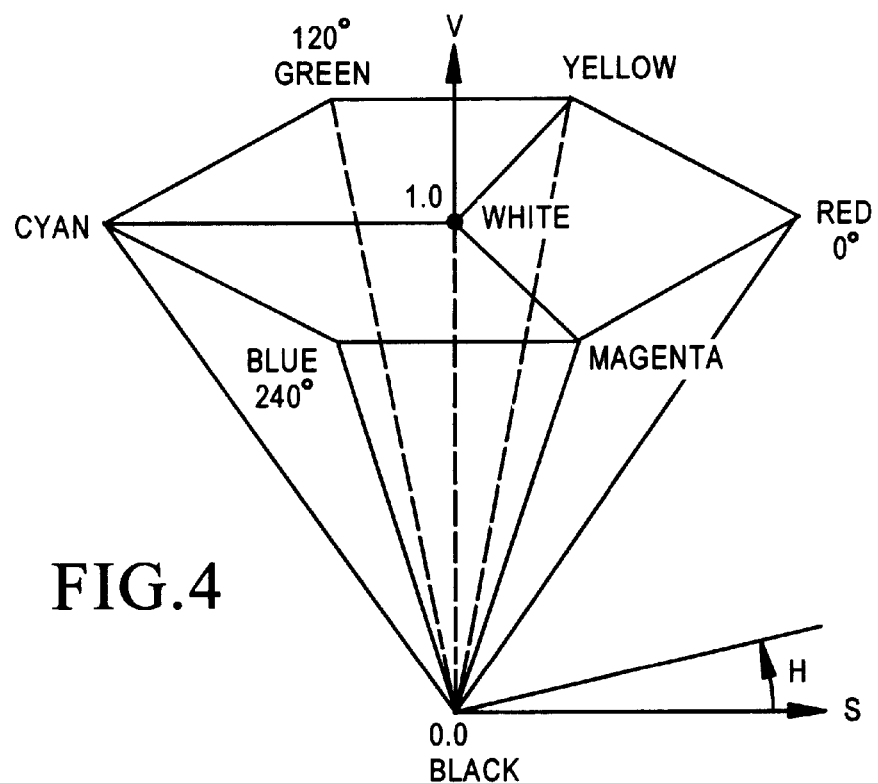
FIG. 4 shows the HSV color model.

In the preferred embodiment, the first algorithm is a transformation to the HSV (hue/saturation/value) color model as shown in FIG. 4. In this model, a fully saturated (saturation=1.0) and fully bright color is represented with the maximum "value" of 1.0. White is shown with the same value (1.0) and a saturation of 0. For the first algorithm, "values" greater than the output gamut, typically 1, are clipped to the limit of the output gamut (1.0), which tends to retain the hue and saturation of each pixel at the expense of variation in brightness. Consequently, detail which is carried in portions of the image which are at the limit of brightness is lost and those areas of the image that are over-saturated, but not over-bright, tend to become darkened. Values less than permitted by the output gamut are also clipped to the gamut and saturation numbers are also clipped to the gamut.

Figure 5:
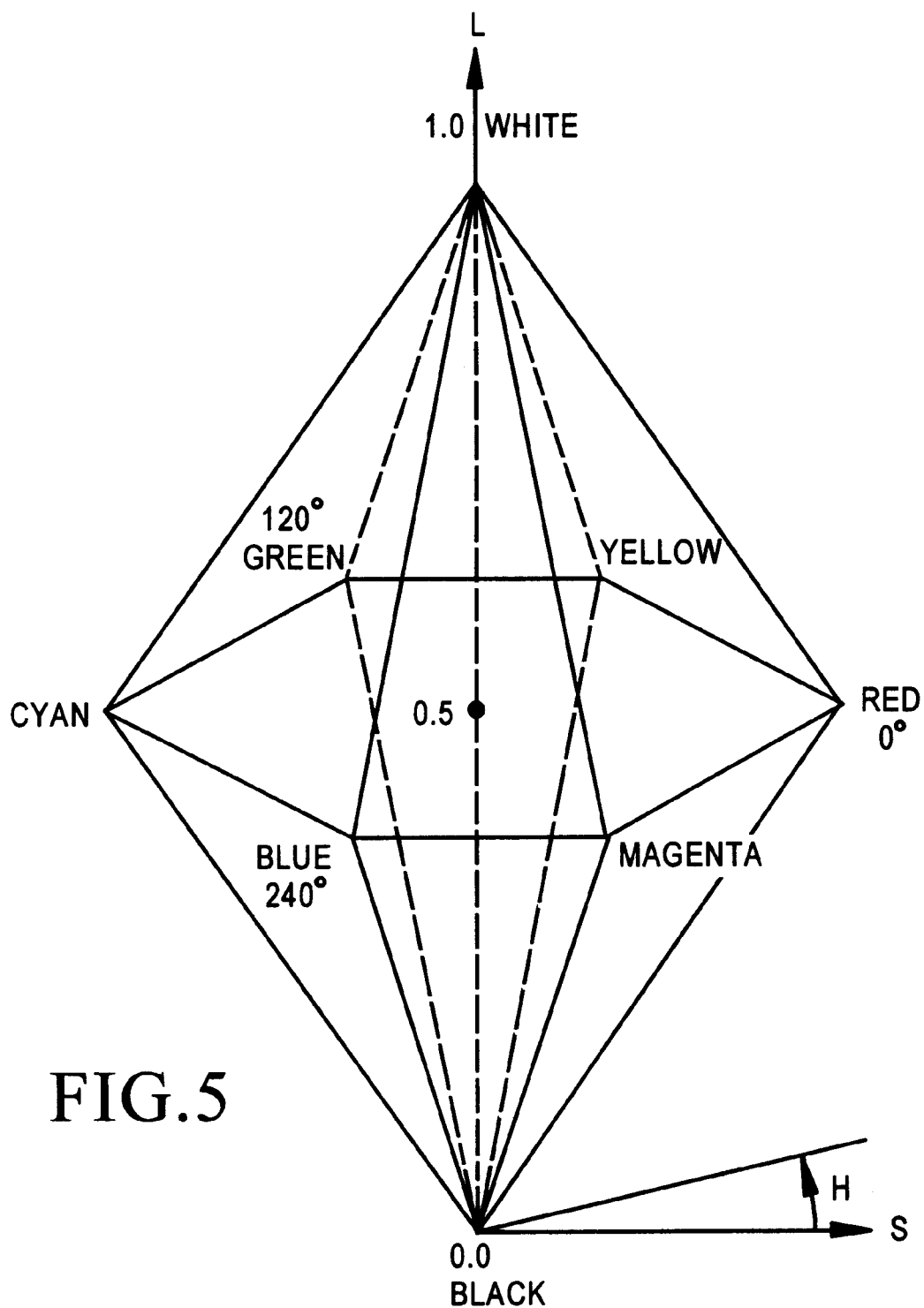
FIG. 5 shows the HLS color model.

The second algorithm transforms the image into the HLS (hue/lightness/saturation) color model as shown in FIG. 5. In this model, fully saturated colors have a "lightness" of 0.5. White has a lightness of 1.0 and black has a lightness of 0. Saturation is constrained to 0 at both white and black, and its limit varies in proportion to its distance from either white or black. After the image is transformed to this model, both saturation and lightness are clipped to the color gamut of the output device within this model. Because this model represents as white any pixel with a lightness of 1, regardless of its hue or saturation, pixels with a lightness clipped to 1 will be represented as white. Unfortunately, this method loses all of the color information in the over bright areas of the image.

The transformation from the RGB color model to the HLS and HSV color models is a one to one mapping with a well known, reversible mathematical expression. Once the clipping or compression is completed, each of the two representations is transformed back to RGB by the reverse process, steps 10 and 11.

The software then causes the system to receive user input on the desired weighting between the two algorithms, step 12. The default is even weighting, so the color balance limit control 1 is initially shown as centered. The user drags the slider to the left or to the right to adjust the weighting given to the two algorithms. The representations of the image in the RGB model are combined with the user selected weighting and the combined image is displayed, step 13. When the user is satisfied, step 14, the image is sent to output, step 15, which might be a saving of the image in a memory, transmission of the image across the network, or sending the image to a printer.

Figure 3:
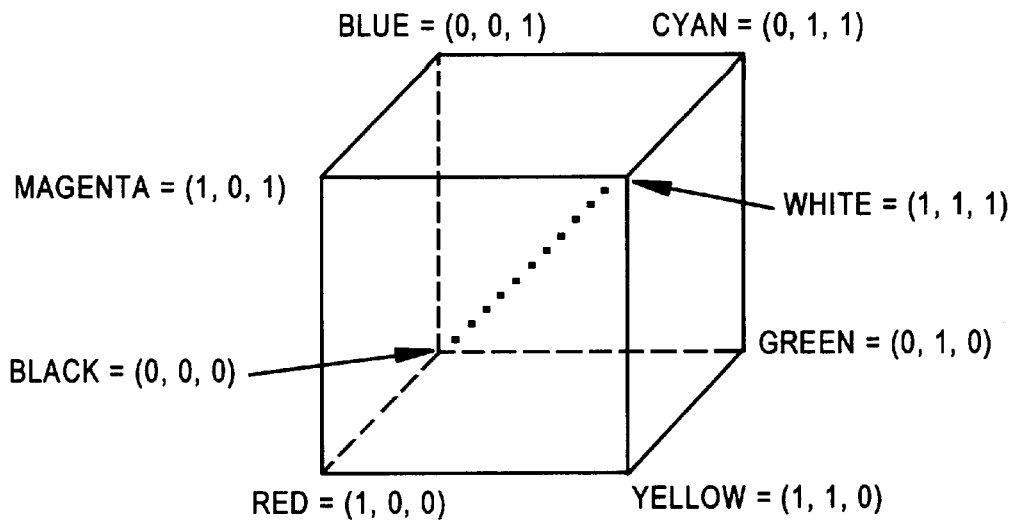
FIG. 3 shows the RGB color model.
Figure 6:
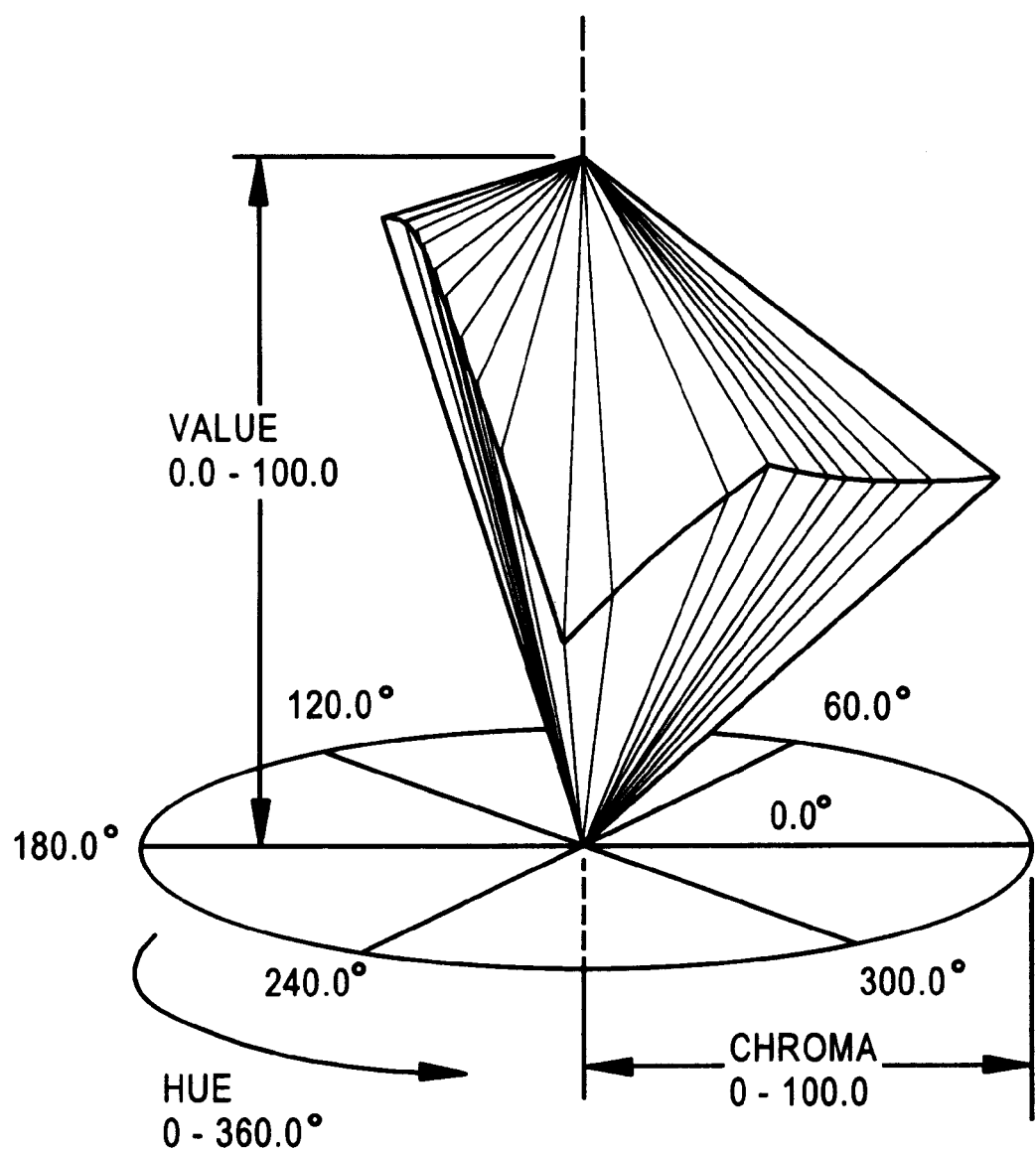
FIG. 6 shows the TekHVC color model.

The essence of the invention is that out of gamut colors are clipped or compressed with two different methods and the user is allowed to choose a balance between the methods for the output. Instead of the HLS and HSV color models, any other color model can be used, including RGB as shown in FIG. 3 or a model intended to be perceptually uniform such as TekHVC as developed by Tekronix, Inc. and shown in FIG. 6 or CIELAB adopted by the CIE (Commission Internationale de l'Eclairage) in 1976. The model for both of the alternative algorithms can be the same. The clipping or compression methods used must yield different results. For example, while retaining hue constant, one of the methods can clip lightness (or brightness or value) while the other method clips chroma (or saturation). Instead of clipping, colors which lie outside the gamut can be transformed along a line toward the center of the gamut until they pass within the gamut boundary, while also transforming all of the more interior colors on the same line to be closer to the center of the gamut. If done uniformly, this is linear compression. The linear compression can keep the lightness constant, in which case each line of compression will be horizontal in a color model with constant lightness in each horizontal plane, or the compression can be along a line which passes through a single center point, such as through the point of saturation 0, lightness 0.5 in the HVC model of FIG. 5. The compression can be non-linear by having a proportionately larger effect on colors near the gamut boundary than on colors near the center of the gamut.

From the foregoing teachings, it will be appreciated by persons having skill in the art that many alternative algorithms can be constructed for implementation of the invention. The user can then be presented with two or more alternative clipping or compression methods which produce different trade-offs, some of which are better for some images and others of which are better for other images. The user can then use the immense visual processing power of the human brain to choose the best balance for the image. Consequently, the invention should not be understood to be limited by any of the above description but rather by the following claims.

I claim:

1. A computer-based method for adjusting color parameters for an image to fit within a color gamut, comprising:
    (a) generating a first color representation of the image using a first algorithm which restricts the first color representation of the image to the color gamut, the first color representation representing any white in the image as white;
    (b) generating a second color representation of the image using a second algorithm which restricts the second color representation of the image to the color gamut, the second color representation being different than the first color representation and representing any white in the image as white; and
    (c) combining the first color representation and the second color representation according to a combination ratio selected by a user to generate a resulting color representation of the image that is restricted to the color gamut.

2. The method of claim 1 wherein the combination ratio comprises a weighted average of the first color representation and the second color representation, and a user selects the ratio.

3. The method of claim 1 wherein the first algorithm employs clipping of out-of-gamut colors.

4. The method of claim 3 wherein the first algorithm employs clipping of lightness of out-of-gamut colors.

5. The method of claim 1 wherein the first algorithm employs compression of out-of-gamut colors.

6. The method of claim 1 wherein the first algorithm transforms the image to a first color model and the second algorithm transforms the image to a second color model which is different from the first color model.

7. The method of claim 1 further comprising:
    (a) generating a third color representation of the image using a third algorithm which restricts the third color representation of the image to the color gamut, the third color representation being different than the first and second color representations and representing any white in the image as white; and
    (b) combining the first, second, and third color representations according to the combination ratio to generate the resulting color representation of the image.

8. A method for allowing a user to adjust the appearance of an image to fall within a color gamut, comprising:
    (a) receiving the color gamut and the image;
    (b) generating a first color representation of the image using a first algorithm which restricts the first color representation of the image to the color gamut and which causes the first color representation to represent any white in the image as white;
    (c) generating a second color representation of the image using a second algorithm which restricts the second color representation of the image to the color gamut and which causes the second color representation to represent any white in the image as white, the second algorithm being different than the first algorithm;
    (d) presenting to the user a control for adjusting a ratio balance between the first color representation and the second color representation; and
    (e) generating a resulting color representation of the image that is restricted to the color gamut by combining the first and second color representations based on the ratio balance selected by the user.

9. The method of claim 8 wherein the combination of the first color representation and the second color representation is created by a weighted averaging of the first and second color representations, and the user selects the balance of weighting.

10. The method of claim 8 wherein the first algorithm employs clipping of out-of-gamut colors.

11. The method of claim 10 wherein the first algorithm employs clipping of lightness of out-of-gamut colors.

12. The method of claim 8 wherein the first algorithm employs compression of out-of-gamut colors.

13. The method of claim 8 wherein the first algorithm transforms the image to a first color model and the second algorithm transforms the image to a second color model which is different from the first color model.

14. The method of claim 8 further comprising:
    (a) generating a third color representation of the image using a third algorithm which restricts the third color representation of the image to the color gamut and which causes the third color representation to represent any white in the image as white, the third algorithm being different than the first and second algorithms;
    (b) presenting to the user the control for adjusting the ratio balance between the first, second, and third color representations; and
    (c) generating the resulting color representation of the image by combining the first, second, and third color representations based on the ratio balance selected by the user.

15. A device for adjusting the appearance of an image based on the color gamut of a presentation device comprising:
    (a) an electronic image input port;
    (b) a processor for generating a first color representation of the image using a first method which restricts the first color representation to the color gamut and for generating a second color representation of the image using a second method which restricts the second color representation to the color gamut, the second color representation being different than the first color representation, the first and second color representations each representing any white in the image as white; and
    (c) a control for adjusting a balance between the first and second color representations; and
    (d) an image generator which generates the image restricted to the color gamut based on the balance between the first and second color representations as selected by a user via the control.

16. The device of claim 15 wherein the image generator comprises an electronic color image display.

17. The device of claim 15 wherein the device comprises a programmed computer and the control is represented on a display and actuated by a pointing device.

18. The device of claim 15 further comprising a brightness control and a contrast control.

19. The device of claim 15 wherein the device comprises a television.

20. The device of claim 15 wherein the first method transforms the image to a first color model and the second method transforms the image to a second color model which is different from the first color model.

21. A computer-readable medium containing a computer program which, when run on a computer, performs a method for adjusting color parameters for an image to fit within a color gamut, comprising the steps of:

(a) generating a first color representation of the image using a first algorithm which restricts the first color representation of the image to the color gamut, the first color representation representing any white in the image as white;

(b) generating a second color representation of the image using a second algorithm which restricts the second color representation of the image to the color gamut, the second color representation being different than the first color representation and representing any white in the image as white; and (c) combining the first color representation and the second color representation according to a combination ratio selected by a user to generate a resulting color representation of the image that is restricted to the color gamut.

22. The computer-readable medium of claim 21 wherein the combination ratio comprises a weighted average of the first color representation and the second color representation, and a user selects the ratio.

23. The computer-readable medium of claim 21 wherein the first algorithm employs clipping of out-of-gamut colors.

24. The computer-readable medium of claim 23 wherein the first algorithm employs clipping of lightness of out-of-gamut colors.

25. The computer-readable medium of claim 21 wherein the first algorithm employs compression of out-of-gamut colors.

26. The computer-readable medium of claim 21 wherein the first algorithm transforms the image to a first color model and the second algorithm transforms the image to a second color model which is different from the first color model.

27. The computer-readable medium of claim 21 wherein the program steps further comprise:

(a) generating a third color representation of the image using a third algorithm which restricts the third color representation of the image to the color gamut, the third color representation being different than the first and second color representations and representing any white in the image as white; and (b) combining the first, second, and third color representations according to the combination ratio to generate the resulting color representation of the image.

28. A memory containing a computer program which, when run on a computer, allows a user to adjust the appearance of an image to fall within a color gamut, said program comprising steps for:

(a) receiving the color gamut and the image;

(b) generating a first color representation of the image using a first algorithm which restricts the first color representation to the color gamut and which causes the first color representation to represent any white in the image as white;

(c) generating a second color representation of the image using a second algorithm which restricts the second color representation to the color gamut and which causes the second representation to represent any white in the image as white, the second algorithm being different than the first algorithm;

(d) presenting to the user a control for adjusting a ratio balance between the first color representation and the second color representation; and (e) generating a resulting color representation of the image that is restricted to the color gamut by combining the first and second color representations based on the ratio balance selected by the user.

29. The memory of claim 28 wherein the combination of the first and second color representations is created by a weighted averaging of the first and second color representations, and the user selects the balance of weighting.

30. The memory of claim 28 wherein the first algorithm employs clipping of out-of-gamut colors.

31. The memory of claim 30 wherein the first algorithm employs clipping of lightness of out-of-gamut colors.

32. The memory of claim 28 wherein the first algorithm employs compression of out-of-gamut colors.

33. The memory of claim 28 wherein the first algorithm transforms the image to a first color model and the second algorithm transforms the image to a second color model which is different from the first color model.

34. The memory of claim 28 further comprising steps for:

(a) generating a third color representation of the image using a third algorithm which restricts the third color representation of the image to the color gamut and which causes the third color representation to represent any white in the image as white, the third algorithm being different than the first and second algorithms;

(b) presenting to the user the control for adjusting the ratio balance between the first, second, and third color representations; and (c) generating the resulting color representation of the image by combining the first, second, and third color representations based on the ratio balance selected by the user.

35. The method of claim 1, further comprising:

(a) a user viewing the resulting color representation of the image; and, (b) the user changing the combination ratio.

36. The method of claim 21, further comprising:

(a) a user viewing the resulting color representation of the image; and, (b) the user changing the combination ratio.

37. A method for adjusting an image such that colors in the image are within a color gamut, the method comprising:

generating a first color representation of the image that is restricted to the color gamut;

generating a second color representation of the image that is restricted to the color gamut, the second color representation being different than the first color representation;

generating a third color representation of the image that is restricted to the color gamut, the third color representation being different than the first and second color representations; and combining the first, second, and third color representations according to a combination ratio to generate a resulting color representation of the image that is restricted to the color gamut.

38. The method of claim 37 wherein:

the combination ratio comprises a weighted average of the first, second, and third color representations; and a user selects the ratio.

39. The method of claim 37 wherein the steps of generating the first, second, and third color representations comprise clipping image colors that are outside of the color gamut.

40. The method of claim 37 wherein the steps of generating the first, second, and third color representations comprise clipping the lightness components of image colors that are outside of the color gamut.

41. The method of claim 37 wherein the steps of generating the first, second, and third color representations comprise compressing image colors that are outside of the color gamut.

42. The method of claim 37 wherein:
the step of generating the first color representation comprises converting the image into a first color model;
the step of generating the second color representation comprises converting the image into a second color model that is different than the first color model; and
the step of generating the third color representation comprises converting the image into a third color model that is different than the first and second color models.

43. An image processing circuit for preparing an image for presentation by a device having a color gamut, the image processing circuit comprising:
a control for adjusting a balance between first, second, and third color representations of the image; and
a processor coupled to the control and operable to,
generate the first color representation using an algorithm that restricts the first color representation to the color gamut,
generate the second color representation of the image using a second algorithm that restricts the second color representation to the color gamut, the second algorithm being different than the first algorithm,
generate the third color representation of the image using a third algorithm that restricts the third color representation to the color gamut, the third algorithm being different than the first and second algorithms, and
generate the image restricted to the color gamut based on the balance between the first, second, and third color representations as selected by a user via the control.

44. The image processing circuit of claim 43 wherein the control comprises a pointing device.

45. The image processing circuit of claim 43, further comprising:
a brightness control coupled to the processor; and
a contrast control coupled to the processor.

46. The image processing circuit of claim 43 wherein:
the first algorithm transforms the image to a first color model;
the second algorithm transforms the image to a second color model that is different than the first color model; and
the third algorithm transforms the image to a third color model that is different than the first and second color models.

47. The image processing circuit of claim 43 wherein the processor is operable to generate the first, second, and third color representations by compressing image colors that are outside of the color gamut.

48. A method for adjusting an image such that colors in the image are within a color gamut, the method comprising:
generating a first color representation of the image using a first algorithm that restricts the first color representation to the color gamut by compressing image colors that are outside of the color gamut such that the compressed image colors are within the color gamut;
generating a second color representation of the image using a second algorithm that restricts the second color representation to the color gamut, the second algorithm being different than the first algorithm; and
combining the first and second color representations according to a combination ratio to generate a resulting color representation of the image that is restricted to the color gamut.

49. The method of claim 48 wherein:
the combination ratio comprises a weighted average of the first and second color representations; and
a user selects the ratio.

50. The method of claim 48 wherein the first and second algorithms employ clipping of the image colors that are outside of the color gamut.

51. The method of claim 48 wherein the first and second algorithms employ clipping of lightness of the image colors that are outside of the color gamut.

52. The method of claim 48 wherein:
the first algorithm transforms the image to a first color model; and
the second algorithm transforms the image to a second color model that is different than the first color model.

53. The method of claim 48 wherein the second algorithm restricts the second color representation to the color gamut by compressing image colors that are outside of the color gamut such that the compressed image colors are within the color gamut.

54. An image processing circuit for preparing an image for presentation by a device having a color gamut, the image processing circuit comprising:
a control for adjusting a balance between first and second color representations of the image; and
a processor coupled to the control and operable to,
generate the first color representation of the image restricted to the color gamut by compressing image colors that are outside of the color gamut such that the compressed image colors are within the color gamut,
generate the second color representation of the image restricted to the color gamut, the second color representation being different than the first color representation, and
generate the image restricted to the color gamut based on the balance between the first and second color representations as selected by a user via the control.

55. The image processing circuit of claim 54 wherein the control comprises a pointing device.

56. The image processing circuit of claim 54, further comprising:
a brightness control coupled to the processor; and
a contrast control coupled to the processor.

57. The image processing circuit of claim 54 wherein the processor is operable to:
generate the first color representation by transforming the image into a first color model; and
generate the second color representation by transforming the image into a second color model that is different than the first color model.

58. The image processing circuit of claim 54 wherein the processor is operable to generate the second color representation by compressing image colors that are outside of the color gamut such that the compressed image colors are within the color gamut.

59. A method for adjusting an image such that colors in the image are within a color gamut, the method comprising:

generating a first color representation of the image by converting the image into a first color model, the first color representation being restricted to the color gamut;

generating a second color representation of the image by converting the image into a second color model that is different than the first color model, the second color representation being restricted to the color gamut and being different than the first color representation; and combining the first and second color representations according to a combination ratio to generate a resulting color representation of the image that is restricted to the color gamut.

60. The method of claim 59 wherein:

the combination ratio comprises a weighted average of the first and second color representations; and a user selects the ratio.

61. The method of claim 59 wherein the steps of generating first and second color representations comprise clipping of the image colors that are outside of the color gamut.

62. The method of claim 59 wherein the steps of generating first and second color representations comprise clipping of lightness of the image colors that are outside of the color gamut.

63. The method of claim 59 wherein the steps of generating the first and second color representations comprise compressing image colors that are outside of the color gamut.

64. An image processing circuit for preparing an image for presentation by a device having a color gamut, the image processing circuit comprising:

a control for adjusting a balance between first and second color representations of the image; and a processor coupled to the control and operable to, generate the first color representation of the image by converting the image into a first color model, the first color representation being restricted to the color gamut, generate the second color representation of the image by converting the image into a second color model that is different than the first color model, the second color representation being restricted to the color gamut and being different than the first color representation, and generate the image restricted to the color gamut based on the balance between the first and second color representations as selected by a user via the control.

65. The image processing circuit of claim 64 wherein the control comprises a pointing device.

66. The image processing circuit of claim 64, further comprising:

a brightness control coupled to the processor; and a contrast control coupled to the processor.

67. The image processing circuit of claim 64 wherein the processor is operable to generate the first and second color representations by compressing image colors that are outside of the color gamut.

* * * * *